United States Patent [19]
Nakel et al.

[11] Patent Number: 4,786,518
[45] Date of Patent: Nov. 22, 1988

[54] IRON MINERAL SUPPLEMENTS

[75] Inventors: Gunther M. Nakel, Aurora, Ind.; Sandra M. Miller, Cincinnati, Ohio

[73] Assignee: The Procter & Gamble Company, Cincinnati, Ohio

[21] Appl. No.: 69,360

[22] Filed: Jul. 2, 1987

[51] Int. Cl.$^4$ .............................. A23L 1/304
[52] U.S. Cl. .................... 426/531; 424/147; 426/74; 426/549; 426/590; 426/599; 426/648; 426/656; 514/502
[58] Field of Search .................. 426/72, 74, 590, 599, 426/648, 531, 656; 424/153, 154, 147; 514/905, 502

[56] References Cited

U.S. PATENT DOCUMENTS

| | | | |
|---|---|---|---|
| 2,325,360 | 7/1943 | Ayers | 99/155 |
| 3,114,641 | 12/1963 | Sperti et al. | 99/105 |
| 3,657,424 | 4/1972 | Aktins et al. | 424/153 |
| 3,950,547 | 4/1976 | Lamar, III | 426/654 |
| 3,992,556 | 11/1976 | Kovacs et al. | 426/620 |
| 4,214,996 | 7/1980 | Buddemeyer et al. | 252/1 |
| 4,351,735 | 9/1982 | Buddemeyer et al. | 252/1 |
| 4,419,369 | 12/1983 | Nichols | 426/656 |
| 4,582,709 | 4/1986 | Peters | 426/659 |

FOREIGN PATENT DOCUMENTS

| | | |
|---|---|---|
| 75-114 | 8/1982 | European Pat. Off. |
| 164657 | 12/1985 | European Pat. Off. |
| 2219778 | 9/1974 | France |
| 54-173172 | 8/1981 | Japan |
| 2095530 | 10/1982 | United Kingdom |

OTHER PUBLICATIONS

Lynch, S. R. and Cook, J. D., (1980), Interaction of Vitamin C and Iron, *Annals New York Academy of Sciences*, 32–44.

Rossander, L., Hallberg, L. and Bjorn-Rasmussen, E. (1979), Absorption of Iron from Breakfast Meals, *Am. J. Clin. Nutr.* 32, 2484–2489.

Carlson, B. L. and Miller, D. D. (1983), Effects of Product Formulation, Processing and Meal Composition on In Vitro Estimated Availability from Cereal Containing Breakfast Meals., *J. Food Sci.* 48, 1211–1216.

Kojima, N., Wallace., D. and Bates, W. G. (1981), The Effects of Chemical Agents, Beverages and Spinach on the In Vitro Solubilization of Iron from Cooked Pinto Beans, *Am. J. Clin. Nutr.* 34:1392–1401.

Ting, S. V. (1980), Nutrients and Nutrition of Citrus Fruits in "Citrus Nutrition and Quality", (edit. Nagy, S. and Attaway, J.), Amer. Chem. Soc., pp. 3–24.

Gillooly, M., Bothwell, T. M., Torrance, J. D., McPhail, A. P., Derman, D. P., Bezwoda, W. R., Mills, W., Charlton, R. W. (1983), The Effects of Organic Acids, Phytates and Polyphenols on the Absorption of Iron from Vegetables, *Br. J. Nutr.* 49, 331–342.

Hallberg, L., Rossander, L. (1984), Improvement in Iron Nutrition in Developing Countries: Comparison of Adding Meat, Soy Protein, Ascorbic Acid, Citric Acid and Ferrous Sulfate on Iron Absorption for a Simple Latin American Type of Meal, *Am. J. Clin. Nutr.* 39: 577–583.

Kelly, S. E., Chawla-Singh, K., Sellin, J. M., Yasillo, N. J., Rosenberg, I. M. (1984), Effects of Meal Composition on Calcium Absorption: Enhancing Effect of Carbohydrate Polymer. *Gastroenterol.* 87, 596–600.

*Remington's Pharmaceutical Sciences*, 15th Ed., 383 (1975).

The Pharmacological Basis of Therapeutics, 5th Ed., 1315–1316 (1975).

Kletzien, S. W., Iron Metabolism, *J. Nutr.* 19, 187–97.

Chapman, D. G., Campbell, J. A., (1957), Effect of Calcium and Phosphorus Salts on the Utilization of Iron by Anaemic Rats., *Br. J. Nutr.* 11, 127–133.

Dunn, J. A. (1968), The Effects of Dietary Calcium Salts and Fat on Iron Absorption in the Rat, *S. Afr. J. Med. Sci.* 33, 65–70.

Barton, J. C., Conrad, M. E., Parmley, R. J. (1983), Calcium Inhibition of Inorganic Iron Absorption in Rats, *Gastroenterology* 84, 90–101.

Dawson-Hughes, B., Seligson, F. J., Hughes, V. A. (1986), Effects of Calcium Carbonate and Hydroxyapatite on Zinc and Iron Retention in Postmenopausal Women, *Am. J. Clin. Nutr.* 44, 83–88.

Seligman, P. A., Caskey, J. H., Frazier, J. L., Yucker, R. M., Podell, E. R., Allen, R. M. (1983), Measurements of Iron Absorption from Prenatal Multivitamin-Minerao Supplements, *Obstetrics and Gyn.* 61, 356–362.

Metrevely, E. G., "Latent Iron Deficiency and Effect of Prophylactic Administration of Medicamentous Iron on the RedBlood Composition of Healthy Young Children", *Pediatriyc*(Moscow) 1977, vol. 12, pp. 17–19.

*Primary Examiner*—Donald E. Czaja
*Assistant Examiner*—Carolyn Paden
*Attorney, Agent, or Firm*—Jerry J. Yetter; Leonard W. Lewis

[57] ABSTRACT

Nutritional mineral supplements comprise iron-sugar complexes, especially iron sucrate-malate. Food and beverage compositions, especially juice beverages, supplemented with these iron materials are disclosed.

12 Claims, No Drawings

IRON MINERAL SUPPLEMENTS

TECHNICAL FIELD

The present invention relates to mineral supplements which comprise certain iron compounds, and foods and beverages containing same. The iron compounds herein are palatable, stable, and can be used to fortify foods and beverages. Moreover, the iron compounds herein are compatible with calcium mineral supplements, especially calcium citrate-malate, thereby allowing the formulation of mixed iron-calcium mineral supplements.

BACKGROUND OF THE INVENTION

Vitamin and mineral supplements for human and veterinary use are commonplace. Recently, it has become recognized that certain groups of the human population may require quite high intakes of minerals to prevent or alleviate certain disease states. For example, the medical management of certain anemias can be handled rather well by increasing the daily intake of iron. Some diets, or heavy physical exercise, may require the intake of considerable quantities of minerals apart from those generally obtained through what otherwise would be considered a balanced diet.

Mineral supplements, such as those commercially available, are useful in many circumstances where enhanced mineral intake is desirable. However, adhering to a regimen which requires the separate intake of mineral supplements can give sub-optimal results, simply because the regimen requires a change in the normal habits and practices of the user. It would be more convenient if the minerals could be included in ordinary foods and beverages, so that they would be ingested without extra attention, planning and implementation on the part of the user.

There are well-recognized problems associated with adding mineral supplements to foods and beverages. For example, many such supplements tend to be rather insoluble, and, therefore, not very useful in beverages, or tend to have a bad taste or unacceptable mouth feel. Iron supplements tend to discolor foodstuffs, or to be organoleptically unsuitable. Moreover, it is particularly difficult to formulate foods and, especially, beverages, containing iron supplements, inasmuch as iron compounds tend to form insoluble iron hydroxide polymers in solution and interact with other minerals, such as calcium, as well as with other materials in foods and beverages. This interaction not only affects the organoleptic and aesthetic properties of the foods and beverages, but also undesirably affects the nutritional bioavailability of the iron supplements.

It would be desirable, therefore, to have iron supplements which are organoleptically acceptable and compatible with foodstuffs, beverages and other minerals, especially calcium, as well as being nutritionally available.

It is an object of the present invention to provide iron mineral supplements which fulfill these unmet needs.

It is a further object of this invention to provide foodstuffs, beverages and beverage concentrates which are supplemented with iron.

These and other objects are secured herein, as will be seen from the following disclosure.

BACKGROUND ART

Some form of iron sucrate has been administered to children and the effect on Hb reported; see the Russian reference Metreveli, E. G., *PEDIATRIYA* (Moscow) 1977, (12), 17–19; C. Abs. 89:637.

*Remington's Pharmaceutical Sciences*, 15th Ed., 393 (1975) indicates that ferrous and ferric ions form soluble coordination complexes with many agents such as ammonium salts, citrates, tartrates, amines, sugar and glycerine, which protect the iron from precipitation by the usual iron precipitants. Iron gluconate and fumarate salts are said to be employed as hematinics.

Goodman and Gilman, *The Pharmacological Basis of Therapeutics*, 5th Ed., 1315–1316 (1975) reports that iron salts have many incompatibilities and should be prescribed alone, preferably between meals, for maximal absorption, but just after meals if necessary to minimize gastric symptoms. Gastrointestinal absorption of iron is reportedly adequate and essentially equal from the following six ferrous salts: sulfate, fumarate, gluconate, succinate, glutamate, and lactate. Absorption of iron is lower from ferrous citrate, tartrate, pyrophosphate, etc. Reducing agents such as ascorbic acid and some chelating agents such as succinic acid may increase absorption of iron from ferrous sulfates, but are said to be not worth the extra cost because of the high efficacy of ferrous sulfate when administered alone. Ferrous sulfate is reported to have a saline, astringent taste, and is mixed with glucose or lactose to protect it against oxidation, when used as an iron supplement.

European Pat. No. 164,657 to Pfeiffer and Langden relates to an iron dextran, which is obtained by adding precipitated ferric hydroxide to dextran produced by adding sucrose solution to a solution of D-glucose and dextran-sucrose enzyme.

U.S. Pat. No. 4,582,709, to Peters and Derick, Apr. 15, 1986, relates to chewable mineral supplements, and lists, inter alia, various calcium and iron compounds.

U.S. Pat. No. 4,351,735, to Buddemeyer, et al, Sept. 28, 1982, relates to mineral supplements which contain certain phosphate moieties. Dispersibility of the compositions is said to be enhanced by "hydroxyl sources", e.g., sugars.

U.S. Pat. No. 4,214,996, to Buddemeyer, et al, July 29, 1980, relates generally to the same subject matter as the '735 patent, above, but claims, inter alia, iron compositions and calcium compositions.

The beneficial effect of orange juice on the uptake of iron from dietary sources is described by Carlson and Miller in JOURNAL OF FOOD SCIENCE 48, 1211 (1983).

European Patent Application No. 75,114, published Mar. 30, 1983, discloses protein-containing fruit juice drinks enriched with vitamins and minerals. These drinks contain 30–90% fruit juice (a mixture of 20–70% apple juice, 4–40% white grape juice, 1–10% passionfruit juice and 5–25% lemon juice), 2 to 20% whey protein concentrate, and a mineral salt mixture of potassium, sodium, magnesium, calcium and phosphate. Calcium is present in these drinks at 0.01 to 0.3%, preferably at 0.02 to 0.03%.

Mineral supplementation of citrus beverages is disclosed in U.S. Pat. Nos. 3,657,424; 2,325,360; 3,114,641; and British Pat. No. 2,095,530.

SUMMARY OF THE INVENTION

The present invention encompasses iron-sugar-carboxylate complexes suitable for administration to humans or animals as a mineral supplement. Typically, the sugar species in these complexes is a member selected from the group consisting of glucose, sucrose (preferred), fructose, and mixtures thereof, and the carboxylate is typically a member selected from the group consisting of malate (preferred), citrate, tartrate and ascorbate. The iron is most preferably in the ferrous state, but ferric iron can also be used.

The invention also encompasses food, beverage or beverage concentrate compositions, comprising a nutritionally supplemental amount of said iron-sugar-carboxylate complexes.

Typical beverage or beverage concentrate compositions herein comprise:
(a) at least about 0.1% by weight of fruit or cola flavor, or at least about 3% by weight of fruit juice; and
(b) a nutritionally supplemental amount of an iron sugar-carboxylate complex selected from the group consisting of iron sucrate-malate, iron fructate-malate, iron sucrate-citrate, iron fructate-citrate, iron sucrate-ascorbate, iron fructate-ascorbate, and mixtures thereof, the iron most preferably being in the ferrous state. Iron II sucrate-malate is most preferred for use as a mineral supplement for beverage compositions, especially citrus beverages.

The fruit juices which can be used herein include, by way of example: grape juice, pear juice, passionfruit juice, pineapple juice, banana juice or banana puree, apricot juice, orange juice, lemon juice, grapefruit juice, apple juice, cranberry juice, tomato juice, tangerine juice, and mixtures thereof.

The invention encompasses beverages, especially juice and cola beverages, which are carbonated in the manner of soft drinks, as well as "still" beverages. The invention also encompasses nectars and full-strength beverage or beverage concentrates which contain at least about 45% by weight of juice. The iron complexes herein are particularly useful with beverages or beverage concentrates made from orange juice or grapefruit juice.

As will be disclosed more fully hereinafter, the iron complexes of this invention can conveniently be used in powder, tablet, chewable lozenge, capsule or liquid form, for enteral or parenteral nutrition, and in combination with conventional foodstuffs, such as breads, cakes, snacks, infant formulations, meat analogs and extenders, spreads, and the like. Importantly, the iron-sugar-carboxylate complexes of this invention are compatible with calcium mineral supplements, especially calcium citrate-malate, which is used to fortify, for example, orange juice beverages. Thus, mixed iron-calcium mineral supplements can be prepared using the iron complexes herein.

All ratios, proportions and percentages herein are by weight, unless otherwise specified.

DETAILED DESCRIPTION OF THE INVENTION

The present invention involves the preparation and use of nutritionally-supplemental amounts of iron-sugar-carboxylate complexes in humans and lower animals.

By "nutritional" or "nutritionally-supplemental amount" herein is meant that the iron complexes used in the practice of this invention provide a nourishing amount of iron to the body. In mineral supplements such as tablets or powders, this supplemental amount will comprise at least 3% of the Recommended Daily Allowance (RDA) of the daily intake of iron, as defined in The United States of America (see Recommended Daily Dietary Allowance-Food and Nutrition Board, National Academy of Sciences-National Research Council). In general, mineral supplements will contain at least 10%, more typically 50% to 300%, of the RDA per unit dose of the supplement. In food or beverage products of the type disclosed herein, the nutritionally supplemental amount will generally comprise more than 3%, preferably 10%–30%, of the RDA per unit portion of the food or beverage product. Of course, it is recognized that the preferred daily intake of any mineral may vary with the user. For example, pregnant, lactating, or post-menopausal females may require an increased intake of calcium or iron, over the usual RDA. Persons suffering with anemia may require an increased intake of iron. Such matters are familiar to physicians and nutritional experts, and usage of the compositions of the present invention may be adjusted accordingly.

In general, and depending somewhat on age, the RDA (iron) ranges from 10 mg per 6 Kg for infants to 18 mg per 54–58 Kg female. As is well-known, it is possible to overdose with iron supplements, especially in males, with deleterious effects to the liver. Typically, foods and beverages are supplemented with only about 10–15% RDA iron (based per serving) to account for iron which is available from other dietary sources (assuming a reasonably balanced diet), thereby avoiding this problem. Of course, if iron toxicity is not deemed an important consideration in individual circumstances, more of the supplements herein can be used.

The "iron-sugar-carboxylate" complexes used in the practice of this invention are prepared in the manner described more fully hereinafter. (These materials are referred to herein as "complexes", but they may, in fact, exist in solution as complicated, highly-hydrated, protected colloids. However, the term "complex" is used herein for simplicity.) While the iron in these complexes can be in the ferric (iron III) state, it is more preferably in the ferrous (iron II) state. Ferrous iron is better tolerated and utilized by the body than ferric iron. Importantly, ferric iron and common ferrous salts can cause off-flavors in some beverages, after storage; ferric iron can also oxidize and degrade ascorbic acid (Vitamin C) in citrus beverages. The complexes used herein can conveniently be thought of as iron-sugar moieties, wherein the carboxylate provides the counterion for the ferrous (preferred) or ferric iron. While not intending to be limited by theory, it is believed that the acceptable taste of these iron complexes is due to the relatively large sizes of the sugar moiety and carboxylate counterion, which mask the usual "well-water" and/or brackish flavor of some iron supplements.

Importantly, the iron complexes provide both good taste quality and good bioavailability, relative to iron compounds such as ferrous sulfate (bad taste/bod bioavailability) or ferrous fumarate (poor bioavailability/good taste, due to low solubility).

The preferred overall synthesis of the iron complexes used in the practice of this invention involves:
(a) forming a calcium-sugar moiety in aqueous media, for example, by reacting calcium hydroxide with a sugar;
(b) reacting an iron source, such as ferrous ammonium sulfate, with the calcium-sugar moiety in aqueous media to provide an iron-sugar moiety; and
(c) neutralizing the reaction system with a carboxylic acid, for example, malic acid, to provide the desired iron-sugar complex.

The preferred iron II-sucrate-malate complex prepared in this manner is essentially equivalent to ferrous sulfate in iron bioavailability (measured as % change in hematocrit of test animals over the range of 0–9 ppm Fe), and, most importantly, is organoleptically quite acceptable in beverages, especially citrus beverages.

The "sugars" which can be employed in the practice of this invention include any of the ingestible saccharidic materials, and mixtures thereof, well-known in the culinary arts. For example, glucose, sucrose and fructose can conveniently be employed, with sucrose and fructose being the more preferred. However, other saccharidic materials can be used, for example mannose, galactose, lactose, maltose, and the like.

The "carboxylate counterion" used in the preparation of the preferred iron-sugar complexes herein can be any ingestible carboxylate species. However, some judgment must be made with regard to flavor contribution. For example, citrate, malate and ascorbate yield ingestible complexes whose flavors are judged to be quite acceptable, particularly in fruit juice beverages. Tartaric acid is acceptable, particularly in grape juice beverages, as is lactic acid. Longer-chain fatty acids may be used in solid mineral supplements, but can affect flavor and water solubility. for essentially all purposes, the malate (preferred), citrate and ascorbate moieties suffice, although others can be selected, according to the desires of the formulator.

In a less preferred mode, counterions for the iron-sugar complex can be noncarboxylate moieties such as phosphate, chloride, sulfate, or the like. However, such counterions can undesirably interact with calcium ions, especially in beverages. In high concentrations, these counterions may contribute an undesirable flavor note. Accordingly, the carboxylate counterions noted above are preferred herein.

The present invention is particularly suited for the preparation of juice beverages and beverage concentrates, particularly orange juice fortified with iron and mixtures of iron with other minerals, especially calcium in the form of calcium citrate-malate. The concentrated orange juice, orange juice aroma and flavor volatiles, pulp and peel oils used in the method of the present invention can be obtained from standard orange juice processing. See Nagy et al, *Citrus Science and Technology*, Volume 2, (AVI Publishing Co. 1977), pp 177–252 (herein incorporated by reference) for standard processing of oranges, grapefruit and tangerines. (See also Nelson et al, *Fruit and Vegetable Juice Processing Technology* (3rd Ed., AVI Publishing 1980),pp. 180–505 (herein incorporated by reference) for standard processing of noncitrus juices such as apple juice, grape juice, pineapple juice, etc. to provide sources of juice and juice materials for mineral-supplemented noncitrus juice products). Fresh juice is extracted from the oranges, principally of the Valencia type. (The peel of the oranges is initially rasped to provide peel oils which can be used in the method of the present invention.) Juices from different oranges are frequently blended to adjust the sugar to acid ratio. A sugar to acid ratio of from about 8:1 to about 20:1 is considered acceptable. However, preferred sugar to acid ratios are typically from about 11:1 to about 15:1.

Juice is extracted from the oranges by using automatic juicing machines, or less often by hand squeezing of the oranges. The type of equipment used to extract the juice is not critical. The raw juice exiting from the squeezing device contains pulp, rag and seeds. The rag and seed are separated from the juice and pulp in a finisher. The juice is then typically separated into a pule portion and a serum portion. (The pulp portion can be used as a source of pulp in the method of the present invention.)

The serum portion can be concentrated by a variety of techniques which typically include evaporative concentration or freeze concentration. In evaporative concentration, the serum portion of the juice is passed through an evaporator (e.g., falling film or temperature accelerated short time evaporate [TASTE] type). Water vapor, as well as the aroma and flavor volatiles, are stripped from the juice. These stripped volatiles are then centrifuged to provide an upper layer (essence oils) and a lower layer (aqueous essence). (A portion of these essence oils and aqueous essence are typically used as the source of orange juice aroma and flavor volatiles for the method of the present invention.) The remaining stripped juice is then concentrated in the evaporator (by heat) to the appropriate amount of solids as measured by the sugar content of the concentrated juice. This concentrated juice can then be used in the method of present invention.

Most concentrated orange juices are obtained by evaporative concentration. However, freeze concentration can also be used to obtain concentrated orange juice useful in the method of the present invention. Freeze concentration typically involves passing the serum portion of the juice through a scraped wall heat exchanger to form substantially pure ice crystals which are then separated from the concentrated juice. A preferred freeze concentration method is disclosed in U.S. Pat. No. 4,374,865 to Strobel, issued Feb. 22, 1983, which is incorporated by reference. Unlike evaporative concentration, concentrated orange juice obtained by freeze concentration typically contains the aroma and flavor volatiles as well.

Juice compositions and other beverages are preferably formulated at a pH below about 4.3, generally about 3.7–4.0, for reasons of microbial stability.

The following examples illustrate the practice of this invention, but are not intended to be limiting thereof.

EXAMPLE I

Preparation of Iron II Sucrate-Malate

Sucrose (85.5 g) is dissolved in water (299.8 g), making sure that dissolution is complete. Calcium hydroxide (18.5 g) is then added, and the mixture is stirred for 5 minutes. Any clouding is observed, and the resulting solution is filtered through a glass filter.

To the resulting calcium-sucrate solution is added ferrous ammonium sulfate (24.5 g), and the solution is covered air-tight (e.g., SARAN WRAP). The green color indicates the iron is in the desired II oxidation state.

To the above solution is added malic acid (33.5 g) in 3 batches, to pH 3–4. The precipitate is filtered through standard filter paper, but the filter cake comprising calcium sulfate is not rinsed. The resulting solution comprises the iron sucrate-malate used in the practice of this invention. The solution can be used per se, or can be freeze-dried to provide the iron sucrate-malate in powder form.

In an alternate mode, KOH can be substituted for Ca(OH)$_2$ in the first step, but sulfate ion will be left in the final product.

Variations in the method for preparing iron-sugar complexes, as well as alternate sugars and counterions, are given in the following examples.

EXAMPLE II

Iron II Sucrate-Malate

Sucrose (1368 g; 4 moles) is dissolved in water (3995 g), making sure all sugar is dissolved. Calcium hydroxide (148 g; 2 moles) is added to the sugar-water and stirred for 5 minutes. The solution is filtered through a glass filter.

To the calcium-sucrate solution is added iron II ammonium sulfate (196 g; 0.5 moles) and covered air-tight with SARAN WRAP. The color should remain green. Malic acid (268 g; 2 moles) is added in three batches. At each addition, a pH reading is taken with litmus paper to insure pH 3-4. The precipitate is filtered-off with a paper filter, and the filter cake is not rinsed. The compound is in the filter liquor.

EXAMPLE III

Iron II Sucrate Malate

Sucrose (684 g; 2 moles) is dissolved in water (2226 g), making sure all sugar is dissolved. Calcium hydroxide (74 g; 1 mole) is added to the sugar-water and stirred for 5 minutes. The solution is filtered through a glass filter.

To the calcium-sucrate solution is added iron II ammonium sulfate (196 g; 0.5 mole) and the solution is covered air-tight with SARAN WRAP. The color should remain green. Malic acid (268 g; 2 moles) is added in three batches. At each addition, a pH reading is taken with litmus paper to insure pH 3-4. The precipitate is filtered (paper filter), and the filter cake is not rinsed. The title compound is in the filter liquor.

EXAMPLE IV

Iron II Sucrate Malate

Sucrose (684 g; 2 moles) is dissolved in water (2856 g), making sure all sugar is dissolved. Calcium hydroxide (148 g; 2 moles) is added and the solution is stirred for 5 minutes. The solution is filtered through a glass filter.

To the calcium sucrate solution is then added iron II ammonium sulfate (392 g; 1 mole) and the system is covered air-tight with SARAN WRAP. The green color should remain. Malic acid (268 g; 2 moles), is added in three batches. At each addition, a pH reading is taken with litmus paper to insure pH 3-4. The precipitate is filtered (paper filter) and the filter cake is not rinsed. The title compound is in the filter liquor.

EXAMPLE V

Iron II Fructate Malate

Fructose (360 g; 2 moles) is dissolved in water (1644 g), making sure all fructose is dissolved. Calcium hydroxide (148 g; 2 moles) is added to the fructose solution and stirred for 5 minutes. The solution is filtered through a glass filter.

To the calcium fructose solution is added iron II ammonium sulfate (196 g; 0.5 mole) and the solution is covered air-tight with SARAN WRAP. The color should remain green. Malic acid (268 g; 2 moles) is added in three batches. At each addition, a pH reading is taken with litmus paper to insure pH 3-4. The precipitate is filtered off (paper filter). The title compound is in the filter liquor.

EXAMPLE VI

Iron II Sucrate-Citrate

Sucrose (684 g; 2 moles) is dissolved in water 2399 g), making sure all sugar is dissolved. Calcium hydroxide (148 g; 2 moles) is added to the solution and stirred for five minutes. The solution is filtered through a glass filter. To the calcium-sucrate solution is added iron II ammonium sulfate (196 g; 0.5 mole) and the solution is covered air-tight with SARAN WRAP. The green color should persist. Citric acid (384 g; 2 moles) is added to the reaction mixture in three batches. At each point of addition, a pH reading is taken with litmus paper to insure pH 3-4. The precipitate is filtered-off (paper filter) and the filter cake is not rinsed. The tital compound is in the filter liquor.

EXAMPLE VII

Iron II Sucrate-Tartrate

Sucrose (684 g; 2 moles) is dissolved in water (2399 g), making sure all sugar is dissolved. Calcium hydroxide (148 g; 2 moles) is added to the sugar solution and stirred for 5 minutes. The solution is filtered through a glass filter.

To the calcium-sucrate solution is added iron II ammonium sulfate (196 g; 0.5 mole) and the solution is covered air-tight with SARAN WRAP. The green color should persist. Tartaric acid (300 g; 2 moles) is added to the solution in three batches. At each time of addition, a pH reading is taken with litmus paper to insure pH 3-4. The precipitate is filtered (paper filter) and removed; the filter cake is not rinsed. The tital compound is in the filter liquor.

EXAMPLE VIII

Iron II Glucate/Fructate-Malate

Glucose (360 g; 2 moles) and fructose (360 g; 2 moles) are co-dissolved in water (1643 g), making sure all sugar is dissolved. Calcium hydroxide (148 g; 2 moles) is added to the sugar-water and stirred for 5 minutes. The solution is filtered through a glass filter.

To the calcium/mixed sugars solution is added iron II ammonium sulfate (196 g; 0.5 moles) and the solution is covered air-tight with SARAN WRAP. The green color should persist. Malic acid (268 g; 2 moles) is added in three batches. At each addition, a pH reading is taken with litmus to insure pH 3-4. The precipitate is filtered-off (paper filter) and the filter cake is not rinsed. The title compound is in the filter liquor.

EXAMPLE IX

Iron II Sucrate-Citrate/Ascorbate

Sucrose (684 g; 2 moles) is dissolved in water (2399 g), making sure all sugar is dissolved. Calcium hydroxide (148 g; 2 moles) is added to the sugar water solution and stirred for 5 minutes. The solution is filtered through a glass filter.

To the calcium-sucrate solution is added iron II ammonium sulfate (196 g; 0.5 mole) and the solution is covered air-tight with SARAN WRAP. The green color should persist. The citric acid (192 g; 1 mole) is first added to the solution, then the ascorbic acid (352 g; 2 moles) is added in three batches. At each time of addition, a pH reading is taken with litmus paper to insure pH 3-4. The precipitate is filtered (paper filter). The title compound is in the filter liquor.

EXAMPLE X

Iron II Fructate-Malate

Fructose (541 g; 3 moles) is dissolved in water (1672 g), making sure all is dissolved. Calcium hydroxide (37 g; 0.5 moles) is added and stirred for 5 minutes. The solution is filtered through a glass filter.

To the calcium-fructose solution is added iron II sulfate (139 g; 0.5 mole), and the solution is covered air-tight with SARAN WRAP. The color should remain green. Malic acid (67 g; 0.5 moles) is added to the solution in three batches. At each addition, a pH reading is taken with litmus paper to insure pH 3-4. The precipitate is filtered-off (paper filter) and the filter cake is not rinsed. The title compound is in the filter liquor.

EXAMPLE XI

Beverage Compositions

The following beverage compositions (a-g) are fortified with the iron composition of Example I to provide 10% RDA of iron per 180 ml serving:
(a) "sparkling" orange juice comprising 55% orange juice and 45% carbonated water;
(b) pear-grapefruit nectar comprising 25% pear juice, 20% grapefruit juice, the balance comprising 10% sucrose-water;
(c) kiwi-grapefruit drink comprising 20% kiwi fruit juice, 15% grapefruit juice, the balance comprising water;
(d) mixed fruit "cocktail" comprising 10% each of the juices of passion fruit, mango, guava, pineapple, papaya, banana, apricot, mandarin orange, pear and lime juices;
(e) yogurt/fruit beverage comprising 20% milk products, 1% pectin, 20% pineapple juice, 10% shredded pineapple fruit pulp, 16% corn syrup, the balance comprising water;
(f) cola beverage comprising 0.35% cola flavor emulsion, 11% sugar, 0.1% phosphoric acid, 0.1% citric and malic acids, carmel coloring, the balance comprising carbonated water;
(g) full-strength apple juice.

EXAMPLE XII

Food Compositions

The following food compositions (a-f) are fortified with the iron composition of Example I to provide 20% RDA of iron per 250 g serving;
(a) salted potato snack product comprising moistened, comminuted potato flakes, shaped and deep-fried in the form of saddle-shaped chips;
(b) peanut butter product comprising finely ground peanuts, up to 3% peanut oil, salt;
(c) cookie product comprising inner core of flour, shortening, flavoring and fructose enrobed in outer layer of flour, shortening, flavoring and sucrose;
(d) brownie snack product comprising commercial DUNCAN HINES brownie mix;
(e) soy-based meat analog product comprising a 50:1 (wt.) mixture of de-oiled soybean meal and egg whites, extruded, in patty or chunk form;
(f) infant formulation in powder or liquid form comprising sterilized soy powder or soy "milk", vanilla flavor, preservative.

When practicing the present invention in combination with a source of calcium, it is preferred to use calcium citrate malate, prepared in the following manner.

EXAMPLE XIII

Preparation of Calcium Citrate-Malate

A calcium citrate-malate solution is prepared by dissolving 2 parts sucrose and then 0.1 part citric and 0.28 part malic acids in 28.19 parts water. Calcium hydroxide (0.22 part) is added and the mixture is agitated. This solution can be used directly to prepare beverages, or can be freeze-dried to use in solid mineral supplements.

Potentiators

The foregoing compositions function exceptionally well as iron supplements, even in the presence of calcium, especially calcium citrate malate. However, it has now also been determined that certain materials act as "potentiators", which still further enhance the bioavailability of calcium. Fructose is one such potentiator, and other carbohydrates, such as sucrose, function similarly, albeit less well than fructose.

However, iron bioavailability is somewhat impaired by the administration of calcium, and this impairment remains, even in the presence of usually-found levels of carbohydrates, including fructose.

It has now been found that citric acid (or citrates) and tartaric acid (tartrates) partially alleviate calcium's inhibitory effect on iron, and mixtures of citric/ascorbic acid (or citrate/ ascorbate mixtures), do overcome the inhibitory effect.

Accordingly, in a preferred mode, this invention also uses a potentiating amount of citrate; or, preferably, citrate/ascorbate; or, citrate/fructose; or, citrate/ascorbate/fructose, or like tartrate combinations, to potentiate iron and calcium bioavailability when these minerals are administered conjointly. It will be appreciated by the formulator that these potentiators can simply be added to the above-exemplified compositions, if not already inherently present.

By "potentiating amount" of the citrate, tartrate, ascorbate, carbohydrate (especially fructose), and mixtures thereof, materials used herein is meant an amount sufficient to further enhance uptake and bioavailability of iron and calcium when administered to humans or lower animals. Of course, even small amounts of these potentiators have some beneficial effect. However, it is preferred to use sufficient potentiator to provide bioavailability levels of the iron/calcium mixtures which are essentially equivalent to iron and calcium supplements when administered separately, and several hours apart. Fortunately, the potentiators used herein are entirely safe for consumption, so there is essentially no upper limit to the amount that can be safely ingested. Moreover, in practical terms, the potentiators are inexpensive, so there is no need for the formulator to carefully balance benefit/cost ratios. Typically, then, the citrate, tartrate and ascorbate potentiators are used in a weight ratio with the minerals (calculated as iron and calcium per se, discounting associated ions or ligands) of potentiator:mineral ranging from 1000:1 to 1:3, generally 3:1 to 1:1. The fructose potentiator may be used in much higher ratios, say, $10^6:1$, since the formulator may also find it useful to include fructose, not only for its potentiating effect, but also for its bulk sweetener effect.

EXAMPLE XIV

Mineral Supplement

A powdered mineral supplement comprises 2,000 mg calcium carbonate, 15 mg iron (II) fructate-malate, prepared in the manner of Example XI, 250 mg citric acid and 100 mg ascorbic acid.

What is claimed is:

1. An iron-sugar-carboxylate complex suitable for administration to humans or anivals as a mineral supplement.

2. A complex according to claim 1 wherein the sugar is a member selected from the group consisting of glucose, sucrose, fructose, and mixtures thereof.

3. A complex according to claim 2 wherein the carboxylate is a member selected from the group consisting of malate, citrate and ascorbate.

4. A complex according to claim 3 wherein the iron is in the ferrous state.

5. A food, beverage or beverage concentrate composition, comprising a nutritionally supplemental amount of an iron-sugar-carboxylate complex.

6. A beverage or beverage concentrate composition according to claim 5, which comprises:
   (a) at least about 0.1% by weight of fruit or cola flavor, or at least about 3% by weight of fruit juice; and
   (b) a nutritionally supplemental amount of an iron sugar-carboxylate complex selected from the group consisting of iron sucrate-malate, iron fructate-malate, iron sucrate-citrate, iron fructate-citrate, iron sucrate-ascorbate, iron fructate-ascorbate, and mixtures thereof.

7. A composition according to claim 6 wherein the fruit juice is selected from grape juice, pear juice passionfruit juice, pineapple juice, banana juice or banana puree, apricot juice, orange juice, lemon juice, grapefruit juice, apple juice, cranberry juice, tomato juice, tangerine juice, and mixtures thereof.

8. A composition according to claim 7 wherein the iron is in the ferrous state.

9. A composition according to claim 8 wherein the iron-sugar-carboxylate is iron II sucrate-malate.

10. A beverage according to claim 9 which is carbonated.

11. A beverage or beverage concentrate according to claim 9 which contains at least about 45% by weight of juice.

12. A beverage or beverage concentrate according to claim 11 which comprises orange juice, grapefruit juice or mixtures thereof.

* * * * *